INVENTOR.
LEONARD S. MEYER
BY
Synnestvedt & Lechner
ATTORNEYS

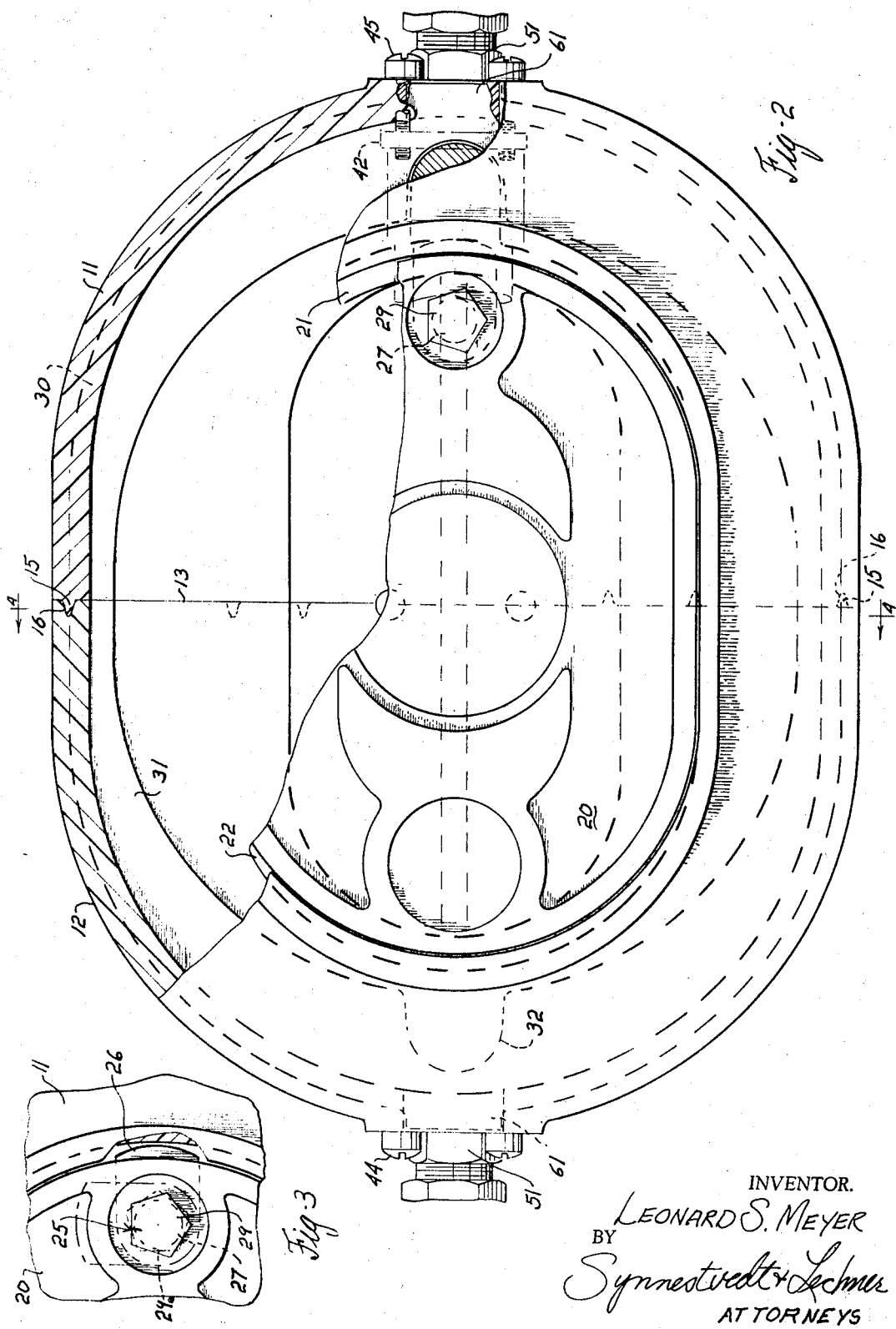

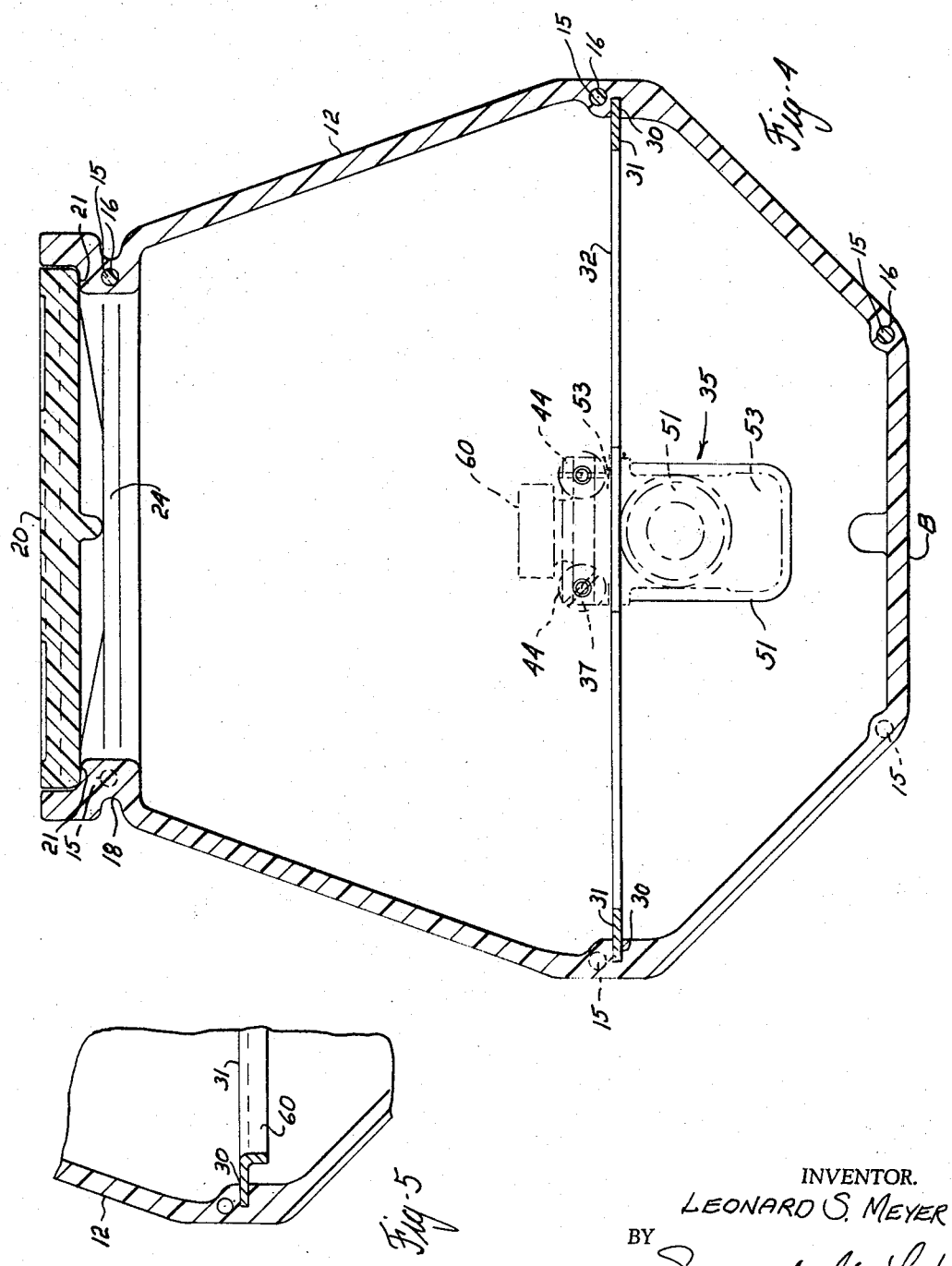

United States Patent Office 3,443,436
Patented May 13, 1969

3,443,436
METER HOUSING STRUCTURE
Leonard S. Meyer, Columbia, S.C., assignor to F. B. Leopold Company, Inc., Zelienople, Pa., a corporation of Delaware
Filed July 11, 1966, Ser. No. 564,441
Int. Cl. G01f 15/14
U.S. Cl. 73—273                8 Claims

ABSTRACT OF THE DISCLOSURE

Meter housing comprises vertically split identical housing sections formed, for example, from reinforced plastic materials. A transversely extending ring-shaped structurally strong yoke member fits within the housing sections providing support for the meter and heater fittings and rigidly locking the housing sections together. The meter supporting fittings are grooved to fit on the yoke, being provided with fluid flow passages extending beneath the yoke and upward extensions through which fasteners extend which serve the purpose of locking all parts together.

---

This invention relates to a meter housing structure.

Although structures built in accordance with the teachings of the invention can be used to house a variety of types of metering equipment, the primary aim of the invention is the provision of a structure which is especially well-suited for the housing of water meters. Because such housings are ordinarily located below the ground level in yards, streets or sidewalks, they must be able to withstand attack from moisture, extremes in temperature, ground movements due to frost and heavy traffic loads for long periods of use. For these reasons, materials such as cast iron or concrete have generally been used for the purpose, and boxes constructed from such materials have been quite heavy and awkward to handle and install.

An important object of the present invention therefore is the provision of a lightweight housing structure, the individual elements of which are interlocked in a manner which forms an exceptionally strong and durable construction. When constructed according to the teachings of the invention, the bulk of the housing parts are preferably made out of synthetic resinous materials, thereby taking advantage of the lightweight, low cost, corrosion resistance and heat insulating capabilities characteristic of such materials.

Another important feature of the invention lies in the provision of a lightweight plastic housing which is simple to manufacture, the housing being made from identical sections which may be molded from a single mold.

Among the oher objects of the invention is the provision of a housing construction in which installation of the meter and assembly of the housing are effected in a single operation, all of the parts of the structure being assembled in place and rigidly interlocked merely by the tightening of a few machine bolts.

These and various other objects of the invention are achieved by a housing construction which comprises a pair of identical housing sections adapted to be joined along a common vertical plane to form a meter housing. A ring-shaped yoke member is mounted on said sections within the housing in a plane substantially parallel to the base of the housing. A pair of fittings are mounted on the ring-shaped yoke on the opposite sides of the housing. Each fitting extends through the housing and is provided with a fluid flow passage having an opening inside of the housing. The openings inside the housing are in axial alignment with each other. Means are provided to interlock the housing sections, the yoke and the fittings together.

The various objects of the invention will be clearly apparent upon reference to the following detailed description of a preferred embodiment of the invention and from the accompanying drawings in which:

FIGURE 2 shows a plan view of the box shown in FIGURE 1, portions of the box being broken away for purposes of illustration;

FIGURE 3 is a detailed view showing the means for locking the lid of the box;

FIGURE 4 is a sectional view taken on line 4—4 of FIGURE 2; and

FIGURE 5 is a fragmentary view of a modified form of the structure shown in FIGURE 4.

Figure 1:
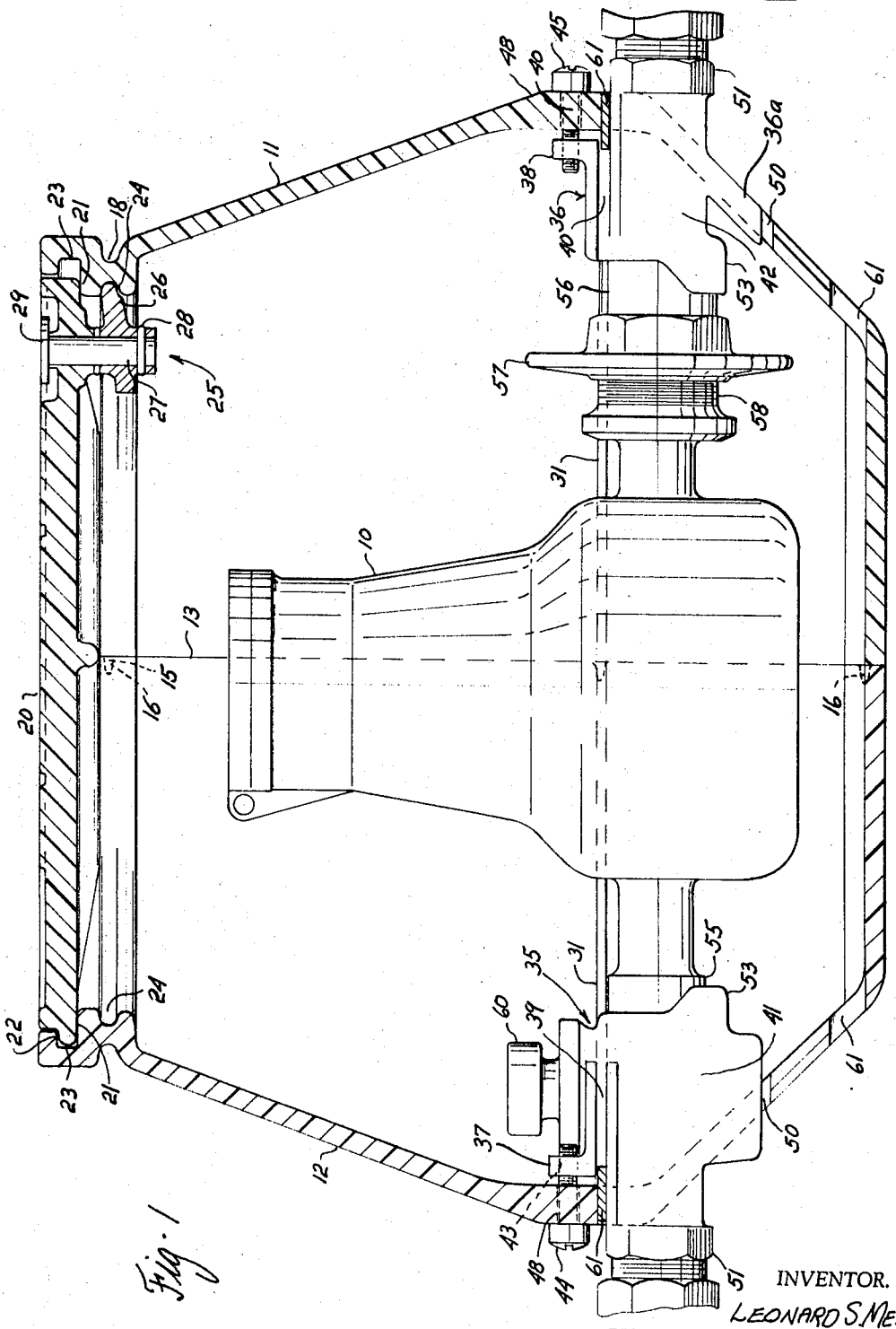
FIGURE 1 shows an elevational view, in section, of a meter box formed according to the invention.

Attention is first directed to FIGURE 1 which shows a conventional water meter 10 mounted within a housing or box formed in accordance with the techniques of the present invention. The box which houses the meter 10 is formed of two separate sections 11 and 12 which are joined together in a manner to be described along a common vertical plane 13. The sections are preferably molded from a polyester resin reinforced with glass fibers, although other moldable materials with or without reinforcing materials could be employed.

The sections 11 and 12 are preferably identical in shape so that the same mold can be used for all sections. Each section is provided with pins 15 on one-half of the surface which lies in the vertical plane 13 and complementary shaped holes 16 in the other half of that surface. When the two sections are fitted together, the pins 15 on one section fit into the holes 16 molded into the other section.

Boxes formed in accordance with the invention are typically oval in cross section as may be seen in FIGURE 2 and are formed with sidewalls inclining inwardly from a common horizontal plane towards a base B and an upwardly facing opening or mouth as is conventional practice in the art.

In use, the housing is intended to be buried in earth or paving material with the mouth flush with the level of the surrounding surface. An annular groove 18 may be molded around the outside of the mouth for interlocking the box with concrete or other paving material.

The box is provided with a lid 20 which may also be molded from a fiber glass reinforced plastic. A distinctively colored dye may be added to the resin from which the lid and housing are made in order to provide a means of color coding housings for meters for different sized water lines or for meters to be connected in lines leading to different buildings.

The lid 20 is oval in shape to conform to the shape of the mouth and rests on ledges 21 molded inside the rim in sections 12 and 13. A lip 22, integral with the lid and extending around a minor portion of its periphery, fits within an annular groove 23 molded into the inside of each housing section.

Locking grooves 24 are formed in the housing sections just below groove 23. The lid has a locking means 25 which includes a portion which is selectively engageable with groove 24 in order to lock the lid firmly in place. Locking means 25, shown in FIGURES 1 and 3, preferably includes a locking cam 26 keyed to a stub shaft 27. The stub shaft is journalled in a bushing molded into the lid adjacent its edge at a point generally opposite from the location of lip 22. The locking cam 26 is keyed to one end of the shaft 27 by means of a pin 28. The upper end of the shaft 27 is provided with a head 29 and has pentagonally shaped wrench receiving surfaces 29a. Rotation of the head is effected by means of a wrench or key and causes the cam 26 to be moved into and out of engagement with the groove 24. The cam is shaped with an inclined surface so that when it is moved into groove 24, lid 20 is drawn tightly into engagement with ledge 21.

An internal annular groove 30 is molded on a line extending around the central portion of the housing. Groove 30 faces inwardly in a substantially horizontal plane and is adapted to receive the outer peripheral edge of a yoke 31 when the housing sections are joined together. Yoke 31 is annular or ring-shaped to conform to the shape of the inside of the housing so that its outer peripheral edge fits tightly within the groove 30 with the edge portions of its top and bottom surfaces firmly supported by the edges of the groove.

The yoke 31 is adapted to support a pair of fittings 35 and 36 which are located at opposite ends of the housing. Each fitting is provided with mounting means including upwardly extending bracket portions 37 and 38 and each has an outwardly facing groove 39, 40 respectively extending around a substantial portion of its periphery.

The grooves 39 and 40 fit into notches 32 which are cut into the inner peripheral edge of the yoke plate 31. When the yoke is fitted in the groove 30 and when the fittings are positioned on the yoke, each fitting is firmly supported by the yoke plate. In that position, the bracket portions 37 and 38 extend upwardly adjacent the housing sidewall. Each of these brackets is provided with a pair of threaded openings. Bolts 44 and 45 are passed through pairs of apertures 48 in the housing sections and are threaded into the openings in the brackets 37 and 38. By tightening the bolts, the fittings are rigidly locked to the yoke plate and the housing sections are held tightly together.

The fittings 35 and 36 each house fluid passageways in the portions 41 and 42 which are suspended below the yoke plate 31. The passageways extend from an opening inside of the housing and extend through housing openings 50. Each fitting has a terminal portion 51 outside of the housing to which water line coupling members are connected.

As is evident from the drawings, meter 10 rests on the fittings 35 and 36. For this purpose, each fitting is provided with a curved lip or support surface 53. The surfaces 53 are adapted to support the meter connecting elements or spuds, generally indicated at 55 and 56.

As is conventional practice in the art, the meter is secured tightly within the meter supporting fittings by a hand wheel 57 which is threaded onto threads 58 on spuds 56. Rotation of the hand wheel causes the axial movement of spud 56. Sealing rings, not shown, surround the openings for the passageways in the fittings 35 and 36. A watertight seal is effected upon advancing the hand wheel in the counterclockwise direction, as viewed from the right hand side of FIGURE 1, thus clamping the meter rigidly in place.

One of the fittings 35 or 36 is generally provided with a valve for controlling flow to the meter 10. A handle 60 of such a valve is shown extending upwardly from the fitting 35. The handle may be provided with a hexagonal recess, not shown, which is adapted to receive the hexagonal end of a valve turning rod so that the valve may be easily opened or closed from outside of the housing.

Fitting 35 is somewhat larger than fitting 36 in order to accommodate its valve mechanism. In order to fill up the extra space in the opening 50 through which fitting 36 extends, this fitting may be provided with a lip portion 36a. While the housing could obviously be made watertight, in most cases this will not be necessary. Instead I prefer to provide suitable holes 61 at the bottom of each section for drainage purposes.

In order to assemble the housing, two identical sections are selected and a yoke 32 is fitted within the grooves 31 in the two sections. Fittings 35 and 36 are mounted on the yoke with the grooved portions 39 and 40 fittig onto the edges of notches 32. Bolts 44 and 45 fit through holes in the housing parts and are tightened to rigidly interlock the entire assembly together.

I prefer that the groove 30 extend completely around the inner periphery of the housing and that the yoke plate 31 be supported within the groove along its entire outer periphery. In this manner, the yoke is reinforced by the housing and is exceptionally resistant to bending or buckling, even when formed of relatively thin sheet material. The arrangement is very well suited for withstanding the bending moments set up when the meter is clamped in place between the fittings 35 and 36.

In some instances, particularly if the yoke plate is made of plastic, it may be desirable to provide the plate with the downturned flange 60 which is shown in FIGURE 5.

For additional strength, the yoke plate may also be provided with tongues 61 which extend through the openings 51 between the top edges of the openings and the top of the fittings 35 and 36. In this way, the housing provides further resistance to the bending moments set up in the yoke by the meter 10.

When formed in accordance with the invention, the yoke plate absorbs the bulk of the stresses set up by the meter, particularly by the expansion forces set up when the meter is secured in place between the fittings 35 and 36. The arrangement is especially effective in avoiding stress concentrations in the plastic, thereby permitting the use of lighter housing materials.

The housing assembly has proven to be exceptionally strong and durable. The arrangement is extremely easy to assemble, being light in weight and put together with the meter installed with very little effort.

It should be noted that the yoke plate not only acts as a means for supporting the meter, but is important as a means to align and interlock the entire assembly together. The housing sections, the fittings and the yoke each cooperate toward that end in a unique and efficient manner, all elements being rigidly held in place when the fittings are bolted to the housing.

Because the housing sections can be made of corrosion proof sections, housings formed according to the invention can be installed in extremely damp locations. The plastic material is a good heat insulator reducing the freezing hazard in colder climates. Where a foam insulation liner is provided within the box, the unit may be installed in locations where subzero temperatures are encountered without risk of freezing.

I claim:

1. A structure for housing a meter comprising a pair of housing sections adapted to be joined along a common vertical plane to form an enclosure for the meter, a separate annular yoke within said enclosure, said yoke being disposed in a plane substantially normal to the common plane, means on the wall of the sections for receiving the yoke, a pair of fittings positioned on opposite sides of said common plane, each dimensioned to fit over the inner peripheral edge of said yoke whereby the fittings are supported on the yoke, a fluid flow passage extending through each fitting, each of said fluid flow passages lying beneath said yoke and having a terminus inside of said housing and a terminus outside of said housing, said fittings having openings therein to receive and support meter spuds a meter on the yoke with the meter spuds being a registry with the fluid flow passageways, each fitting further having an upper portion extending above said yoke, and fastener means for connecting each said upper portion to the adjacent housing section, thereby interlocking said housing sections, said yoke and said fittings.

2. A structure according to claim 1, wherein said housing sections are identical.

3. A structure according to claim 2, further including grooves in said housing sections, said grooves being arranged to receive outer peripheral edge portions of said yoke.

4. A structure according to claim 3, further including an outwardly facing groove in each fitting, said grooves being adapted to fit over the inner peripheral edge of said annular yoke.

5. A structure according to claim 1, said housing sections being molded from a reinforced synthetic resinous material.

6. A structure for housing a meter comprising a pair of substantially identical housing sections adapted to be joined along a common plane to form an enclosure having bottom and side walls, an inwardly facing, transversely extending, groove in each housing section, a separate annular yoke having outer peripheral edge portions shaped to fit within said housing grooves, said grooves being positioned to hold said yoke in a plane normal to the plane in which said sections are joined, a pair of meter connecting fittings mounted on the inner peripheral edge of said yoke on opposite sides of said common plane, said fittings each having substantially horizontally extending grooves dimensioned to fit over the inner peripheral edge of said yoke thereby supporting the fitting on the yoke, each fitting having an upper portion extending above said yoke, fastener means for connecting said upper portion to the adjacent housing section, thereby interlocking said housing sections, said yoke and said fittings, said fittings each having a lower portion extending beneath the plane of the yoke, and a fluid flow passageway in each fitting, each said passageway in each said lower portion extending beneath said yoke from a terminus inside of said housing to a terminus outside of said housing.

7. A structure according to claim 6, said housing sections being molded from a reinforced synthetic resinous material.

8. A structure according to claim 7, wherein said yoke has a pair of laterally projecting tongue portions and slots in said housing sections through which said tongues are adapted to extend, said tongues being positioned adjacent the point at which said fittings are mounted.

References Cited

UNITED STATES PATENTS

| | | | |
|---|---|---|---|
| 1,133,386 | 3/1915 | Lofton | 73—201 |
| 2,127,041 | 8/1938 | Martin | 73—431 |
| 2,331,759 | 10/1943 | Barnette | 73—431 |
| 2,379,053 | 6/1945 | Weingart | 73—431 |
| 2,767,754 | 10/1956 | Lederer et al. | 73—431 |
| 3,212,339 | 10/1965 | Olmedo | 73—431 |

FOREIGN PATENTS 167,424   8/1921   Great Britain.

JAMES J. GILL, *Primary Examiner.*

R. S. SALZMAN, *Assistant Examiner.*

U.S. Cl. X.R.

73—431